Patented Oct. 1, 1935

2,016,198

UNITED STATES PATENT OFFICE 2,016,198

RESIN AND PROCESS OF MAKING IT

Arthur M. Howald, Pittsburgh, Pa., assignor to Toledo Synthetic Products, Inc., Toledo, Ohio, a corporation of Ohio No Drawing. Application May 15, 1929, Serial No. 363,412

30 Claims. (Cl. 260—3)

This invention relates to improvements in the manufacture of molding compositions from ureas and formaldehyde and it comprises improvements in processes of making molding compositions useful in the production of stable, commercially satisfactory heat-set molded articles by molding under heat and pressure; and it further comprises molding compositions thus produced; all as more fully hereinafter set forth and as claimed.

This invention relates particularly to resins formed by condensation of aldehydes, particularly formic aldehyde, with urea and/or other amids and amines. As is well known, it is possible to produce from urea and formaldehyde glass-like or porcelain-like finished articles of an extremely desirable nature; but the many proposed processes looking to this end have not proved uniformly successful in practice; they have not given uniformly reproducible results. What are possibly the best results as to final products are given by making a sirupy initial condensation product, casting (not molding), baking and finally shaping. The method, however, requires much skill, is not reliable and is inconvenient, wasteful and laborious.

It is the purpose of the present invention to provide a method giving reproducible results and more convenient in operation, the final articles being molded under heat and pressure from a dry molding powder which may be packaged and stored.

With this molding powder, I achieve one of the principal objects of this invention which is to obtain a final glassy resinous product which has a high degree of resistance to the effects of aging, temperature changes and light.

Another object is the production of a resinous material which is relatively unaffected by water or atmospheric moisture.

Another object is the production of a resinous material which is comparatively unaffected by ordinary organic solvents and which is resistant to the effects of acids and alkalies.

Still another object is the provision of a molding powder which may be molded into transparent objects and which is capable of being made water-white or colored in its transparent form.

Another object is the provision of a molding powder which may be molded in closed dies under heat and pressure into objects that may be made transparent and water-white or colored in their transparent form.

Another object is the provision of material of this class which may be molded with fillers to form objects of pure white, or light shades, or brilliant colors.

A specific object of the process is the production of a final glassy resinous material substantially free from uncombined constituents, particularly uncombined urea or uncombined formaldehyde; thus insuring stability of the product.

Another specific object of the process is to avoid the formation in the resin of deleterious non-resinous materials.

Another object is the improvement in resins and processes of making them which results from adding during the process a substance which performs the dual function of acting as a hydrogen ion adjusting medium during the process and acting as a plasticizer in the product; and Still another object is the provision of a process for the manufacture of aldehyde-urea resins which is susceptible to control during all stages of its practical operation.

I achieve all of the above mentioned objects by means of my new and advantageous process which comprises the essential steps and modifications as follows: An aqueous solution of formaldehyde (commercial formalin) which is ordinarily rather acid is partially neutralized with a suitable base until the said aqueous solution is but slightly acid (pH 6 to 7). I find it advantageous to use an organic base which does not combine, or is little reactive, with formaldehyde. Triethanolamine is such an organic base and it may be advantageously used. To this slightly acid aqueous solution of formaldehyde, I add urea and then heat the solution thus obtained to boiling under refluxing conditions until the exothermic reaction is substantially complete; that is, until the spontaneous boiling of the solution ceases. The urea is added in such an amount as to leave an excess of formaldehyde. After the exothermic reaction is complete I then may add a further amount of urea and again boil the solution under refluxing conditions to effect a further reaction and combination. The solution of condensation products thus obtained is then concentrated by evaporation to a thick syrup. During this concentration it is mainly water which is evaporated; although a minor amount of formaldehyde may also be removed, it being volatile. The thick syrup thus obtained is then made alkaline by the addition of a suitable base, advantageously triethanolamine. This alkaline syrup may be advantageously given, or adjusted to, a pH of 7 to 7.5; in certain cases a pH value of 7.3 being used. Then, to the thick alkaline syrup, there is added a certain amount of thiourea and the mixture thus obtained is heated to effect a further reaction. The thiourea is added to combine with the remaining uncombined formaldehyde contained in the said thick syrup. I add the thiourea in the ratio of nearly 1 mol. of thiourea to 2 mols of remaining uncombined formaldehyde. This remaining uncombined formaldehyde is best determined by analysis. After the remaining formaldehyde has combined with the urea the reaction mixture thus obtained is evaporated to a very thick syrup. In evaporating to this very thick syrup I find it advantageous to operate by heating the reaction mixture and passing a current of air therethrough. The current of air also serves to stir the syrup. Before the syrup becomes a substantially dry solid, I find it advantageous to add a plasticizing agent; first cooling the hot thick syrup somewhere below 60° C. I find it advantageous to use an unsaturated ester of a polybasic acid with a polyhydric alcohol; that is, an ester containing free acid groups. This particular plasticizing agent not only serves as a plasticizer but also assists in adjusting the acidity of the molding composition in an advantageous manner. However, I may also use other plasticizing agents such as esters of meta-toluene sulphon-amid, naphthols, etc. In using these plasticizers I find it is advantageous to dissolve therein an organic acid advantageously of comparatively high molecular weight. For instance, I may use phthalic acid, tartaric acid or salicylic acid. These acids dissolve in the plasticizer to form a solid solution. With such a solid solution of organic acid in a plasticizer, as for instance, in a resinous plasticizer such as the meta-toluene sulphon-amid, the molding composition is plasticized and its acidity becomes advantageous later. In converting the composition as so far produced into a substantially dry solid condition by further evaporation, I find rapid evaporation advantageous. The hot syrupy mass may be subjected to reduced pressure thereby causing the syrup to puff up and solidify, producing a porous mass which may be easily ground to a powder and dried in that form.

In my process, the urea and formaldehyde are reacted together in a slightly acid aqueous solution, there being present an excess of formaldehyde in an aqueous, alkaline, thick syrup containing the initial condensation products of the formaldehyde and urea. It is by this arrangement and correlation that I advantageously accomplish many of the objects outlined ante. Further, the condensation products thus produced are quickly converted into substantially dry molding compositions. This thick syrup is mainly composed of primary reaction products of formaldehyde with urea and thiourea and contains a minor portion of water and volatiles. Heretofore it has been difficult to remove from any such concentrated very thick syrups the last portions of water and other volatiles. But by using reduced pressure, some portions of the volatiles are utilized to expand or puff up the thick syrup forming a porous, friable solid, which is easily ground to a powder from which the residual volatiles can be easily removed by simply drying.

I have found that for the complete conversion of urea into a desirable constituent of my resinous product it is important that an excess of formaldehyde be present during the early stages of the process. The amount of formaldehyde required in excess varies with the temperatures at which the process in its various stages is carried out and is affected by the strength of the solutions employed, the hydrogen ion concentration maintained and with other factors. Quantitatively the amount of aldehye required will vary with the conditions enumerated to from 5 or more mols to 2 or slightly less mols for each mol. of urea used. The excess of aldehyde must be eliminated, however, in the final stages, and the permanence of the product and its resistance to disintegrating influences depend largely upon the completeness of such elimination. The excess of aldehyde should be eliminated to such a degree that the final ratio of mols to aldehyde combined with mols of urea is about 1½:1. It is an important feature of my process that the final elimination of aldehyde is accomplished by causing the excess of aldehyde intially employed to combine with a substance to form a desirable constituent of the final product.

In carrying out my process I prefer to employ 10.3 parts, dry weight, of formaldehyde in 35 to 40 per cent aqueous solution, which solution is brought to a pH of 6.6, the adjustment of the pH being preferably made by the addition of triethanolamine. For this purpose, triethanolamine has the advantage over other organic bases of being but little reactive with formaldehyde. I then add to the solution 7 parts dry weight of urea, filtering, if necessary, to remove undissolved foreign matter. The clear solution is then heated to boiling. Sufficient heat is evolved in the reaction to cause spontaneous boiling. The vapors evolved are refluxed until this spontaneous boiling ceases. Two parts dry weight of additional urea are then added and the solution again refluxed for about thirty minutes and then concentrated by evaporation in an open pan until 44.5 per cent of the original constituents, chiefly water, have evaporated and the solution has been reduced to the condition of a thick syrup.

Using commercial 40 per cent formalin, the molecular ratios of urea, formaldehyde and water are nearly 1:2.25:6. With these proportions, and with a period of boiling under a reflux, that is, at constant volume, reactions occur which are important in producing the final glassy product of good quality. The nature of these reactions is not known. To obtain a ratio of urea to formaldehyde in the final product of 1:1.5, the initial excess of 0.75 molecule formaldehyde must be disposed of.

The pH is then further adjusted to 7.3 and thiourea is added in about the ratio of 1 mol. of thiourea to 2 mols of the remaining uncombined formaldehyde. The amount of formaldehyde remaining uncombined prior to the addition of the thiourea will vary slightly with different batches of materials and is best determined by analysis. It is unnecessary to repeat the analysis each time the process is carried out unless there has been a change in the materials used. The amount of thiourea to be added will usually be about 2.5 parts dry weight for the quantities indicated.

After the addition of the thiourea the syrup is boiled slowly for one-half hour and then evaporated with heat, while stirred with an air stream, to a very thick syrup. At this point, after cooling to below 60° C., it is necessary to further adjust the pH to a value of between 5 and 3 and to also add a plasticizing agent. I accomplish both results by the addition of an unsaturated ester of a polybasic acid with a polyhydric alcohol, that is, an ester containing free acid groups.

The process is continued by placing the material in a vacuum dryer, whereupon it rapidly puffs up to a porous mass which may be easily ground to a powder. The grinding may be done at any subsequent time. It is usually desirable to further dry after grinding.

The powder thus obtained may be molded under heat and pressure to form transparent water-white articles of glass-like appearance. If it is desired that the molded products be tinted or colored without losing their transparency, this may be effected by adding a soluble dye to the syrup at the time the plasticizer is added. Opaque or translucent molded objects will result if non-soluble pigments or fillers are added with the plasticizer.

The hydrogen ion concentration of the solution may be adjusted by the use of bases other than triethanolamine and may be varied somewhat from the exact figures given without materially affecting the final result.

Other agents may be used instead of thiourea to combine with the excess of formaldehyde, but it is important that the agent be such as will form, in combining with the formaldehyde, a desirable constituent of the resin, such as a resin of proper characteristics or a substance which will serve as a plasticizer. For example, urea may be employed in place of thiourea. The use of urea entails, however, a very close and difficult control of the process.

Instead of using the plasticizer specified, it is feasible to employ for plasticizing purposes such miscible materials as esters of meta-toluene-sulfon-amid, naphthols, etc., but when such plasticizers as these are employed the additional object of pH adjustment should be obtained by dissolving in the plasticizer an organic acid preferably of a comparatively high molecular weight, such as phthalic acid, tartaric acid, or salicylic acid.

The above description of my invention is to be regarded as illustrative only, and it is to be understood that the invention is susceptible to variation within the spirit and scope of the subjoined claims, in which the terms urea, aldehyde, formaldehyde and triethanolamine include equivalent substances.

I claim:—

1. In the manufacture of satisfactory molding compositions from ureas and formaldehyde, the improved process which comprises bringing a 35 to 40 per cent aqueous solution containing approximately 10.3 parts dry weight of formaldehyde to a pH of 6.6 by the addition of triethanolamine, adding to the solution approximately 7 parts dry weight of urea, heating the solution to boiling and refluxing until spontaneous boiling ceases, adding about 2 parts dry weight of additional urea, again refluxing the solution for about thirty minutes, concentrating the solution by evaporation in an open pan until about 44.5 per cent of the original constituents have evaporated and the solution has been reduced to a thick syrup, adjusting the pH to about 7.3, adding thiourea in the ratio of 1 mol. of thiourea to 2 mols of the remaining uncombined formaldehyde, boiling the syrup slowly for about one-half hour, evaporating with heat while stirring with an air stream to a very thick syrup, cooling to below 60° C., adding an ester of a polybasic acid with a polyhydric alcohol containing free acid groups in sufficient quantity to bring the pH to a value of between 5 and 3, and drying in a vacuum dryer.

2. In the manufacture of satisfactory molding compositions from ureas and formaldehyde, the improved process which comprises bringing a 35 to 40 per cent aqueous solution of approximately 10.3 parts dry weight of formaldehyde to a pH of 6.6 by the addition of triethanolamine, adding to the solution approximately 7 parts dry weight of urea, heating the solution to boiling and refluxing until spontaneous boiling ceases, adding about 2 parts dry weight of additional urea, again refluxing the solution for about thirty minutes, concentrating the solution by evaporation in an open pan until about 44.5 per cent of the original constituents have evaporated and the solution has been reduced to a thick syrup, adjusting the pH to about 7.3, adding thiourea in the ratio of 1 mol. of thiourea to 2 mols of the remaining uncombined formaldehyde, boiling the syrup slowly for about one-half hour, evaporating with heat while stirring with an air stream to a very thick syrup, cooling to below 60° C., adding a plasticizing and acidifying agent, and drying in a vacuum dryer.

3. In the manufacture of satisfactory molding compositions from ureas and formaldehyde, the improved process which comprises bringing a 35 to 40 per cent aqueous solution of approximately 10.3 parts dry weight of formaldehyde to a pH of 6.6 by the addition of triethanolamine, adding to the solution approximately 7 parts dry weight of urea, heating the solution to boiling and refluxing until spontaneous boiling ceases, adding about 2 parts dry weight of additional urea, again refluxing the solution for about thirty minutes, concentrating the solution by evaporation in an open pan until about 44.5 per cent of the original constituents have evaporated and the solution has been reduced to a thick syrup, adjusting the pH to about 7.3, adding thiourea in the ratio of about 1 mol. of thiourea to 2 mols of the remaining uncombined formaldehyde, boiling the syrup slowly for about one-half hour, evaporating with heat while stirring with an air stream to a very thick syrup, cooling, adding a plasticizing and acidifying agent, and drying in a vacuum dryer.

4. In the manufacture of satisfactory molding compositions from ureas and formaldehyde by improved processes, the steps of preparing a fusible heat-hardening urea-formaldehyde condensation product suitable as an ingredient of said molding composition, which comprise bringing a 35 to 40 per cent aqueous solution of approximately 10.3 parts dry weight of formaldehyde to a pH of 6.6 by the addition of triethanolamine, adding to the solution approximately 7 parts dry weight of urea, heating the solution to boiling and refluxing until spontaneous boiling ceases, adding about 2 parts dry weight of additional urea, again refluxing the solution for about thirty minutes, concentrating the solution by evaporation in an open pan until about 44.5% of the original constituents have evaporated and the solution has been reduced to a thick syrup, adjusting the pH to about 7.3, and adding thiourea in the ratio of about 1 mol. of thiourea to 2 mols of the remaining uncombined formaldehyde.

5. In the manufacture of satisfactory molding compositions from ureas and formaldehyde, the improved process which comprises bringing a 35 to 40 per cent aqueous solution of formaldehyde to a pH of from 6 to 7 by the addition of an organic base, adding urea in a quantity of less than 1 mol. of urea to 2.25 mols of formaldehyde, heating to boiling and refluxing until spontaneous boiling ceases, adding additional urea to bring the molar ratio to nearly 2.25 mols of formaldehyde to 1 mol. of urea, refluxing, concentrating to a thick syrup by evaporation in the open, adjusting the pH to between 7 and 7.5, adding thiourea in the ratio of nearly 1 mol. of thiourea to 2 mols of the remaining uncombined formaldehyde as determined by analysis, again boiling, evaporating to a very thick syrup, cooling, increasing the hydrogen ion concentration, and providing the product with a plasticizer.

6. In the manufacture of satisfactory molding compositions from ureas and formaldehyde by improved processes, the steps of preparing a fusible heat-hardening urea-formaldehyde condensation product suitable as an ingredient of said molding composition, which comprise bringing a 35 to 40 per cent aqueous solution of formaldehyde to a pH of from 6 to 7 by the addition of an organic base, adding urea in a quantity of less than 1 mol. of urea to 2.25 mols of formaldehyde, heating to boiling and refluxing until spontaneous boiling ceases, adding additional urea to bring the molar ratio to nearly 2.25 mols of formaldehyde to 1 mol. of urea, refluxing, concentrating to a thick syrup by evaporation in the open adjusting the pH to between 7 and 7.5, and adding thiourea in the ratio of 1 mol. of thiourea to 2 mols of the remaining uncombined formaldehyde as determined by analysis.

7. In the manufacture of satisfactory molding compositions from ureas and formaldehyde by improved processes, the steps of preparing a fusible heat-hardening urea-formaldehyde condensation product suitable as an ingredient of said molding composition, which comprise bringing a 35 to 40 per cent aqueous solution of approximately 10.3 parts dry weight of formaldehyde to a pH of approximately 6.6, adding to the solution approximately 7 parts dry weight of urea, bringing about a combination of the urea with part of the formaldehyde, adding approximately 2 parts dry weight of additional urea, bringing about a further combination of the urea, making the solution of condensation products thus obtained alkaline and adding thiourea in the ratio of approximately 1 mol. of thiourea to 2 mols of the remaining uncombined formaldehyde.

8. In the manufacture of satisfactory molding compositions from ureas and formaldehyde, the improved process which comprises bringing a 35 to 40 per cent aqueous solution of approximately 10.3 parts by weight of formaldehyde to a slightly acid condition, adding to the solution approximately 7 parts dry weight of urea, bringing about a combination of the urea with part of the formaldehyde adding approximately 2 parts by weight of additional urea, bringing about a further combination of the urea, adjusting the reaction mixture to a slightly alkaline condition, adding thiourea in the ratio of approximately 1 mol. of thiourea to 2 mols of the remaining uncombined formaldehyde, bringing about a combination of the thiourea and formaldehyde, concentrating, plasticizing, and drying.

9. In the manufacture of satisfactory molding compositions from ureas and formaldehyde, the improved process of claim 8, wherein the solution is brought to a condition of slight acidity at the time of the first addition of urea, the hydrogen ion concentration is adjusted to a condition of slight alkalinity at the time of the addition of the thiourea and is brought finally to a pronounced acid condition at the time of the addition of the plasticizer.

10. In the manufacture of satisfactory molding compositions from ureas and formaldehyde, the improved process of claim 8, wherein the solution is brought to a pH of about 6.6 at the time of the first addition of urea, the hydrogen ion concentration is adjusted to a pH of 7.3 at the time of the addition of the thiourea and is brought finally to a pH of between 5 and 3 at the time of the addition of the plasticizer.

11. In the manufacture of satisfactory molding compositions from ureas and formaldehyde, the improved process of claim 8, in which the final condition of pronounced acidity is effected by using as a plasticizer an ester of a polybasic acid with a polyhydric alcohol containing free acid groups.

12. In the manufacture of molding compositions from ureas and formaldehyde by improved processes, the steps of preparing a fusible heat-hardened urea-formaldehyde condensation product suitable as an ingredient of said molding composition which comprise reacting together an excess of formaldehyde with urea in a slightly acid aqueous solution, concentrating the initial reaction product thus obtained to a syrup, making the said syrup slightly alkaline, adding thiourea to said alkaline syrup, reacting the thiourea with the excess of formaldehyde contained in said alkaline syrup, and isolating as a dry material the molding composition thus produced.

13. In the manufacture of molding compositions, the process which comprises forming an initial condensation product by reacting urea with an excess of formaldehyde in a slightly acid solution, adding additional urea to the initial condensation product thus produced and again heating to effect further reaction and reduce the ratio of formaldehyde to urea, concentrating the reaction mixture thus produced to a thick syrup, making said syrup slightly alkaline, adding thiourea to the alkaline syrup and heating the mixture thus obtained to effect further reaction, and then isolating the reaction products thus produced in the form of a substantially dry molding composition.

14. In the manufacture of molding compositions from ureas and formaldehyde, the process which comprises reacting together urea and formaldehyde in excess in a slightly acid solution having a pH value between 6 to 7, concentrating the initial reaction product thus obtained to a thick syrup, making the said syrup slightly alkaline by adjusting the pH to between 7 to 7.5, adding thiourea to said alkaline syrup to react with the excess formaldehyde contained in said alkaline syrup and isolating the molding composition thus produced in the form of a substantially dry powder.

15. The process of claim 14 wherein the said slightly acid aqueous solution has a pH value of 6.6 and the said slightly alkaline syrup has a pH value of 7.3.

16. In the manufacture of molding compositions, the process which comprises partially neutralizing an aqueous formaldehyde solution to produce a slightly acid aqueous solution, adding urea to said slightly acid solution, heating said mixture to form an initial condensation product, adding additional urea and effecting further reaction, concentrating by evaporation the reaction products thus produced to a thick syrup, making said syrup slightly alkaline, adding thiourea to the slightly alkaline syrup and effecting a further reaction by heating, concentrating the reaction mixture thus obtained to a very thick syrup, cooling said thick syrup to below 60° C., adding a plasticizer, subjecting the mixture thus produced to reduced pressure, thereby forming a solid porous mass, grinding said porous mass to a powder and drying thus producing a molding composition as a substantially dry powder free from volatiles.

17. The process of claim 16 wherein the said plasticizer is an ester of meta-toluene-sulphonamid.

18. In the manufacture of molding compositions, the process which comprises nearly neutralizing an aqueous formaldehyde solution to produce a slightly acid aqueous solution, adding urea to said slightly acid solution, heating said mixture to form an initial condensation product, adding additional urea and effecting further reaction, concentrating by evaporation the reaction products thus produced to a thick syrup, making said syrup slightly alkaline, adding thiourea to the slightly alkaline syrup and effecting a further reaction by heating, concentrating the reaction mixture thus obtained to a very thick syrup, cooling said thick syrup to below 60° C., adding a plasticizer to the cooled thick syrup, said plasticizer having dissolved therein an organic acid, subjecting the mixture thus produced to reduced pressure, thereby forming a solid porous mass, grinding said porous mass to a powder and drying thus producing a molding composition as a substantially dry powder free from volatiles.

19. The process of claim 18 wherein said organic acid is phthalic acid.

20. The process of claim 18 wherein said organic acid is tartaric acid.

21. The process of claim 18 wherein said organic acid is salicylic acid.

22. In the manufacture of a molding composition, the steps of the process which comprises admixing a solid, relatively non-volatile plasticizer having dissolved therein an organic acid, with a warm thick syrup comprising condensation products of formaldehyde with ureas, subjecting the warm mixture thus produced to reduced pressure to rapidly evaporate volatiles contained in said mixture thus producing a solid porous, friable mass, and grinding said porous mass to a powder, the temperature of said warm mixture being below 60° C. and said reduced pressure being below atmospheric pressure.

23. In the manufacture of molding compositions, the process which comprises partially neutralizing an aqueous formaldehyde solution to produce a slightly acid aqueous solution, adding urea to said slightly acid solution, heating said mixture to form an initial condensation product, adding additional urea and effecting further reaction, concentrating by evaporation the reaction products thus produced to a syrup, making said syrup slightly alkaline, adding thiourea to the slightly alkaline syrup and effecting a further reaction by heating, concentrating the reaction mixture thus obtained to a very thick syrup, cooling said thick syrup to below 60° C., adding an ester of a polybasic acid with a polyhydric alcohol containing free acid groups, subjecting the mixture thus produced to reduced pressure thereby forming a porous mass and grinding said porous mass to a powder, thus producing a molding composition as a substantially dry powder free from volatiles.

24. The process of claim 23, in which triethanolamine is used to partially neutralize the aqueous formaldehyde solution.

25. In the manufacture of molding compositions, the process which comprises adding urea to a slightly acid aqueous solution of formaldehyde, the urea being added in approximately the ratio of 1 mol. of urea to 2.95 mols of formaldehyde; heating said mixture to form an initial condensation product, adding approximately 0.285 mol. of urea and effecting further reaction, concentrating by evaporation the reaction products thus produced to a thick syrup, making said syrup slightly alkaline, adding thiourea to the slightly alkaline syrup in approximately the ratio of 0.28 mol. of thiourea and effecting a further reaction by heating, and isolating the molding composition thus produced in the form of a substantially dry powder.

26. In the manufacture of molding compositions, the process which comprises adding urea to a slightly acid aqueous solution of formaldehyde, the urea being added in approximately the ratio of 1 mol. of urea to 2.95 mols of formaldehyde; heating said mixture to form an initial condensation product, adding approximately 0.285 mol. of urea and effecting further reaction, concentrating by evaporation the reaction products thus produced to a thick syrup, making said thick syrup slightly alkaline, adding thiourea to the slightly alkaline syrup in approximately the ratio of 1 mol. of thiourea to 2 mols of remaining uncombined formaldehyde contained in said alkaline syrup, effecting a further reaction by heating, and isolating the molding composition thus produced in the form of a substantially dry powder.

27. In the production of useful products by the reaction of ureas on formaldehyde in aqueous solution, the process which comprises forming an initial reaction by heating urea with an excess of formaldehyde in a slightly acid solution, concentrating the solution of the initial reaction product thus obtained to a syrup, making the said syrup slightly alkaline, adding thiourea to said alkaline syrup and concentrating the mixture thus obtained by evaporation.

28. As a new and improved molding composition suitable for production of stable heat-set molded articles by molding under heat and pressure, a molding composition comprising a fusible heat-setting urea-formaldehyde condensation product and a solid, relatively non-volatile plasticizer, said plasticizer having dissolved therein an organic acid.

29. The improved molding composition of claim 28 wherein said plasticizer is an ester of meta-toluene-sulfonamid.

30. The improved molding composition of claim 28 wherein said organic acid is phthalic acid.

ARTHUR M. HOWALD.